(12) United States Patent
Akpinar et al.

(10) Patent No.: US 10,834,528 B2
(45) Date of Patent: Nov. 10, 2020

(54) MOBILE DEVICE POSITIONING SYSTEM AND METHOD

(71) Applicant: Pointr Limited, London (GB)

(72) Inventors: Ismail Ege Akpinar, London (GB); Mehmet Can Akpinar, London (GB); Chris Charles, London (GB); Yasar Safkan, Istanbul (TR)

(73) Assignee: POINTR LIMITED, London (GB)

( * ) Notice: Subject to any disclaimer, the term of this patent is extended or adjusted under 35 U.S.C. 154(b) by 17 days.

(21) Appl. No.: 15/134,965

(22) Filed: Apr. 21, 2016

(65) Prior Publication Data

US 2016/0330584 A1 Nov. 10, 2016

(30) Foreign Application Priority Data

Apr. 21, 2015 (GB) .................................. 1506794.5

(51) Int. Cl.
| | | |
|---|---|---|
| *H04W 4/02* | (2018.01) | |
| *H04W 48/10* | (2009.01) | |
| *H04B 17/318* | (2015.01) | |
| *H04W 24/02* | (2009.01) | |
| *G01S 1/04* | (2006.01) | |
| *G01S 5/02* | (2010.01) | |
| *G01C 21/20* | (2006.01) | |
| *H04W 4/80* | (2018.01) | |
| *G01S 5/14* | (2006.01) | |

(52) U.S. Cl.
CPC .......... *H04W 4/023* (2013.01); *G01C 21/206* (2013.01); *G01S 1/042* (2013.01); *G01S 1/0428* (2019.08); *G01S 5/02* (2013.01); *G01S 5/0252* (2013.01); *G01S 5/14* (2013.01); *H04B 17/318* (2015.01); *H04W 4/025* (2013.01); *H04W 4/80* (2018.02); *H04W 24/02* (2013.01); *H04W 48/10* (2013.01); *G01S 5/0226* (2013.01)

(58) Field of Classification Search
CPC ..... H04W 64/00; H04W 4/02; H04W 64/003; H04W 4/043; H04W 4/04; G08C 17/02; G08C 2201/70
USPC ................................................ 455/456.1–457
See application file for complete search history.

(56) References Cited

U.S. PATENT DOCUMENTS

| | | | | |
|---|---|---|---|---|
| 2005/0227703 A1* | 10/2005 | Cheng | ................... | H04W 64/00 455/456.1 |
| 2006/0240840 A1* | 10/2006 | Morgan | .............. | H04W 64/003 455/456.1 |
| 2008/0280624 A1 | 11/2008 | Wrappe | | |
| 2010/0109864 A1* | 5/2010 | Haartsen | ............... | G01C 21/206 340/539.13 |
| 2013/0053059 A1* | 2/2013 | Kruglick | ................ | H04W 64/00 455/456.1 |
| 2013/0260798 A1* | 10/2013 | Moshfeghi | ............ | H04W 4/029 455/456.5 |

(Continued)

*Primary Examiner* — Allahyar Kasraian

(57) ABSTRACT

A mobile device positioning system includes a receiver to receive data on a plurality of signals received by a mobile device, each of the signals being from a transmitter in an area, the positioning system including a processor configured to execute computer program code for determining, in dependence on the data, a relative distance of the mobile device with respect to each transmitter associated with the respective signals and for determining a position of the mobile device in between the transmitters of the received signals in dependence on the determined relative distance.

19 Claims, 5 Drawing Sheets

(56) References Cited

U.S. PATENT DOCUMENTS

| | | | |
|---|---|---|---|
| 2014/0141784 A1* | 5/2014 | Schmidt | H04W 36/32 |
| | | | 455/437 |
| 2014/0155086 A1* | 6/2014 | Bhatia | G01S 5/0242 |
| | | | 455/456.1 |
| 2014/0228044 A1* | 8/2014 | Jones, Jr. | G01S 5/0226 |
| | | | 455/456.1 |
| 2015/0185023 A1* | 7/2015 | Pittman | G01C 21/206 |
| | | | 701/494 |
| 2015/0249907 A1* | 9/2015 | Gupta | H04W 4/043 |
| | | | 455/456.1 |
| 2016/0094947 A1 | 3/2016 | Shen et al. | |
| 2016/0146614 A1* | 5/2016 | Gupta | G06Q 30/06 |
| | | | 701/461 |
| 2016/0286345 A1* | 9/2016 | MacDonald | H04L 67/18 |

* cited by examiner

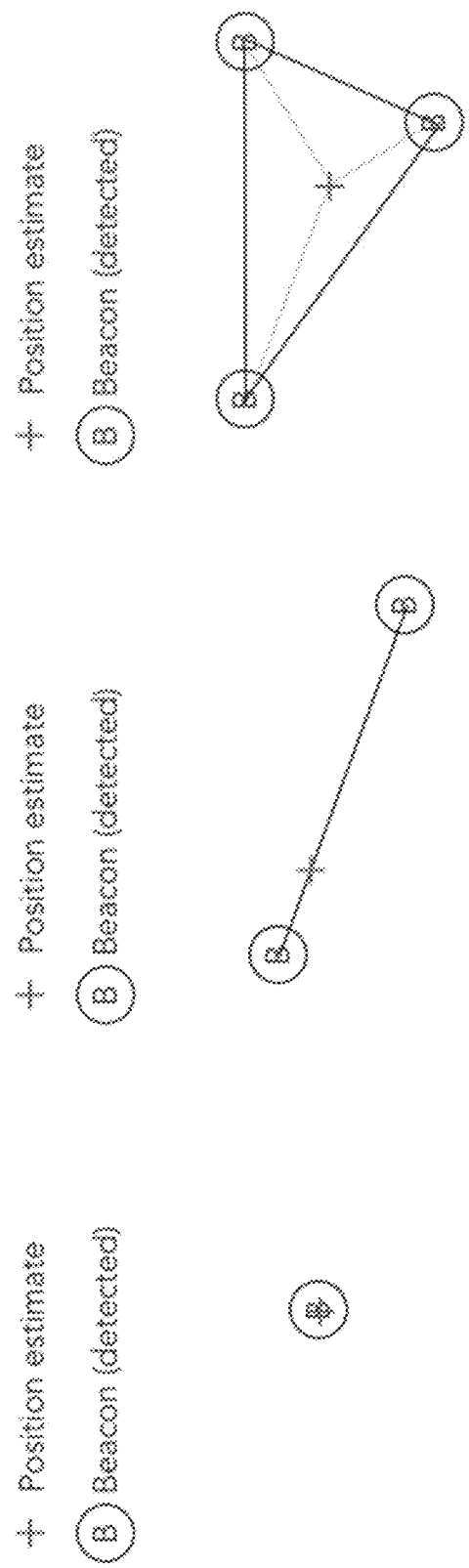

10/80

MOBILE DEVICE POSITIONING SYSTEM AND METHOD

CROSS-REFERENCE TO RELATED APPLICATIONS

This application is based on and claims priority to Great Britain Patent Application Serial No. 1506794.5, filed on Apr. 21, 2015, which is hereby incorporated by reference as if set forth in its entirety herein.

FIELD OF THE INVENTION

The present invention relates to a system and method for determining position of a mobile device and is particularly applicable to determining position in an indoor environment.

BACKGROUND OF THE INVENTION

There are many reasons why it is desirable to know the location of a mobile device. Once you know where a mobile device is located, there are a great many applications that become available such as route planning, personnel/child/valued item tracking, location display etc. With the growing interest in wearable technology and also augmented reality systems, accurate location determination becomes increasingly important.

Current techniques used in determining position of a mobile device include systems based on using one or more of the following types of signal data: WiFi, RFID, GPS, smartphone accelerometer, smartphone compass and smartphone cellular antenna.

Most popular techniques in the field of position calculation are those systems based on WiFi, GPS/AGPS and dead reckoning using smartphone sensors.

WiFi systems typically involve fingerprinting (a process of measuring WiFi signal strength in every footfall of a venue, with enough granularity), mapping these signal to the venue's map and then doing probability calculation of position by comparing currently heard signals to the generated signal model of the venue.

RFID systems involve active or passive connection between a reader and tags which can estimate position based on signal strength received from the reader.

GPS/AGPS systems are based on applying triangulation to data from GPS (Global Positioning System) satellites. Position is calculated based on change in distance and angle of projection. AGPS, which is short for Assisted GPS, enhances GPS calculation by factoring in heard WiFi signals.

Dead reckoning systems are based on using, and usually fusing, different sensors found on most advanced smartphones and similar devices that may include an accelerometer, a gyroscope, a magnetometer/compass and, recently, a barometer.

Each of these approaches are not without their problems. Particularly when a mobile device is located indoors or in an environment where there are many obstacles between the mobile device and transmitters such as cell towers, the GPS systems' satellites etc, reliability can, at best, be poor and in some cases positioning may not be possible at all.

WiFi systems, which are most popular, face the following challenges:
Expensive hardware—WiFi routers are not cost effective.
Non-trivial setup—WiFi based systems require fingerprinting of a location. For an indoor location such as a venue, this involves measuring signals across the whole footfall of the venue. This is a lengthy and very error-prone process, which has critical impact on the system performance.
Non-trivial maintenance—Changes in physical circumstances (such as re-location of metal-heavy furniture, or changing of venue layout such as walls or doors, as well as interference from other WiFi routers brought into/brought away from the vicinity) will cause the system to perform poorly until fingerprinting is carried out again. This is not easy to measure and not cost-effective to maintain either.
OS restrictions—some operating systems, as of this writing, do not allow detecting of WiFi signals in official mobile development SDK's. This effectively blocks official use of this technique on such as in iOS devices (which include iPhone, iPad and iPod's), disabling the technology for almost half of the smartphone population.
Poor resolution—WiFi has high range and works with expensive hardware, hence typical installations consist of only several routers. However, a low number of routers causes the resolution performance to perform poorly. RFID systems, face the following challenges:
Expensive hardware—RFID readers are expensive (up to 10 times more expensive than an average smartphone)
Proprietary hardware—Users require special RFID tags to utilise the system. It is not possible to do indoor positioning on smartphones.
Lack of features—RFID is suitable for tracking items. However, it is not possible for users to see their real-time position on their device (unless every user is given a RFID reader which is not feasible).
Limited use—They are not suitable for additional features such as collecting user profile information which enable powerful analytics data.
GPS/AGPS systems are not able to provide good performance indoors as they are based on connection to satellites. Indoor venues often lack good signal, especially in developed countries (where setting up base stations very densely is not allowed due to health concerns)
Dead reckoning systems typically use modern smartphone sensors such as accelerometer, gyroscope, magnetometer and recently barometer. Challenges are:
Lack of robustness—In most dead reckoning systems, errors in local calculations accumulate over time, leading to unacceptable results. This is caused by lack of reliable reference points, which is an inherent problem.
Variability across devices—Different devices have different hardware and different software delivering the sensor results, hence it is very challenging to have a set of algorithms that provide relevant performance across a variety of devices (e.g. smartphones)
High impact by external factors—External factors can easily degrade performance to an unacceptable level, such as high magnetic interference causing the compass to report incorrect heading, or user carrying the device in his pocket freely moving, making accelerometer a magnitude more difficult to analyse.

SUMMARY OF THE INVENTION

According to an aspect of the present invention, there is provided a mobile device positioning system including a receiver to receive data on a plurality of signals received by a mobile device, each of the signals being from a transmitter in an area, the positioning system including a processor configured to execute computer program code for determining, in dependence on the data, a relative distance of the mobile device with respect to each transmitter associated with the respective signals and for determining a position of the mobile device in between the transmitters of the received signals in dependence on the determined relative distance.

The receiver may be arranged to passively listen to signals from transmitters to thereby receive the signals.

Each of the transmitters may comprise a BlueTooth beacon, the signals comprising advertisements from the beacons.

The processor may be configured to execute computer program code to select a positioning algorithm in dependence on the number of transmitters from which signals are received, the processor being configured to execute computer program code for the selected algorithm to determine position of the mobile device.

Upon signals being received by two or more transmitters, the processor may be configured to execute computer program code for an algorithm to determine a weighted position between the two or more transmitters.

The processor may be configured to execute computer program code to weight the position in dependence on attributes of the signals received.

The attributes of the signals may include strength of each received signal.

The attributes may include absolute distance between transmitter and mobile device, the processor being configured to execute computer program code to determine strength of each received signal according to:

$$\text{absolute distance (in meters)} = e^{((-RSSI-A)/n)}$$

where RSSI is signal strength in dB and A and n are system parameters.

According to another aspect of the present invention, there is provided a method of determining position of a mobile device, comprising:
receiving, from the mobile device, data on a plurality of signals received by the mobile device, each signal being from a different transmitter and the data including a measure of the strength of the respective signal;
determining a location of the transmitter of each respective signal;
determining a zone in between the transmitters;
determining a position of the mobile device within the zone in dependence on the measure of the strength of each respective signal.

The method may further comprise the steps of:
recording all beacon advertisement signals received by the mobile device;
filtering the signals to obtain those having predetermined properties or labels;
storing the obtained signals in memory; and,
using signal data from at least a subset of the stored obtained signals to calculate a position for the mobile device.

The method may further comprise displaying, on a user interface, the position of the mobile device.

The method may further comprise overlaying a marker for the mobile device at the position on a graphical illustration of the zone.

The method may further comprise displaying a graphical indicator around the marker, the graphical indicator representing a determined degree of accuracy for the position.

According to another aspect of the present invention, there is provided a positioning system comprising a plurality of transmitters and a receiver, the receiver being arranged to receive a signal from at least a subset of the transmitters, the positioning system being configured to determine, in dependence on each received signal, the relative distance between the receiver and the respective transmitter and to determine a position of the receiver in dependence on the determined relative distance.

The positioning system may further comprise a graphical user interface, the positioning system being configured to output the determined position on the graphical user interface.

The positioning system may be arranged to overlay a marker for the mobile device at the position on a graphical illustration of an area including the transmitters.

The positioning system may be further arranged to display a graphical indicator around the marker, the graphical indicator representing a determined degree of accuracy for the position.

The positioning system may further comprise a data repository encoding a graphical illustration of the area, the positioning system being arranged to access the data repository and obtain the graphical representation.

The positioning system and data repository may be components of a mobile device.

Each transmitter may comprise a BlueTooth Low Energy transmitter or beacon.

It will be appreciated that transmitters need not be dedicated devices. For example, they could be other devices such as phones acting as transmitters. While transmitters ideally would be fixed so that positioning can be done with respect to a fixed position, they could be mobile if they themselves have a way of obtaining (and preferably advertising) their position.

According to an aspect of the present invention, there is provided a method of determining position of a mobile device, comprising:
receiving, from the mobile device, data on a plurality of signals received by the mobile device, each signal being from a different transmitter and the data including a measure of the strength of the respective signal;
determining a location of the transmitter of each respective signal; determining a zone in between the transmitters;
determining a position of the mobile device within the zone in dependence on the measure of the strength of each respective signal.

According to another aspect of the present invention, there is provided a positioning system arranged to receive data on a plurality of signals received by a client, each of the signals being from a transmitter in an area, the positioning system being configured to determine, in dependence on the data, a relative distance of the client with respect to each transmitter associated with the respective signals and to determine a position of the client in between the transmitters of the received signals in dependence on the determined relative distance.

According to another aspect of the present invention, there is provided a positioning system comprising a plurality of transmitters and a receiver, the receiver being arranged to receive a signal from at least a subset of the transmitters, the positioning system being configured to determine, in dependence on each received signal, the relative distance between the receiver and the respective transmitter and to determine a position of the receiver in dependence on the determined relative distance.

In one embodiment, the positioning system is arranged to output the determined position on a graphical user interface. In one embodiment, the positioning system is arranged to overlay a marker for the mobile device at the position on a graphical illustration of the zone. In one embodiment, the positioning system is arranged to access a data repository and obtain the graphical representation. In another embodiment, the positioning system is arranged to locally cache the graphical representation. In one embodiment, the representation includes a map. In one embodiment, the location of the transmitters are marked on, linked to or defined with respect to the graphical representation.

Embodiments of the present invention seek to provide a system and method for determining location of mobile devices. The mobile devices may be used specifically for location (for example, a security tag or the like) or they may be generic devices such as smart phones having functionality that is utilized for determining location. Preferably, the mobile device uses Bluetooth Low Energy or similar technologies, although it may use WiFi or other wireless communication technology. Preferred embodiments apply an assumption that a mobile device is in between all heard transmitters (such as BLE beacons) in an area. Data on the received signal is used in preferred embodiments to determine relative proximity of the mobile device to each heard transmitter.

Transmitters and receivers may be smartphones or similar devices. In preferred embodiments of the present invention, a number of devices or components are distributed at (preferably fixed) locations in an area. They may be application specific devices or components mounted or otherwise fixed at a location or they may optionally be integrated within other devices including alarm security sensors such as tag detection systems used at exits of retail stores, alarm motion sensors and the like. Components are typically small and low power and could be installed with or integrated into any fixture such as lighting, public address systems computer terminals and the like. Likewise, the mobile device could vary. For example, it may be a suitably configured smartphone (which could act as a transmitter or receiver depending on the configuration needed), a dedicated device, a tag (which could be carried, affixed to a valuable item bag etc) or could be a component of another item or device.

Embodiments of the present invention seek to provide a multiplatform, easy to install, low cost to maintain, ubiquitous, high performance and robust location determination system. In preferred embodiments, BLE capable devices (e.g. smartphones) and BLE advertising beacons are utilized.

Multiplatform—Embodiments of the present invention are capable of working across all devices and device types with BLE reading capability. Both Android and iOS smartphones are capable of reading BLE signals officially. In addition, a wide array of mobile devices (such as other smartphones, various wearable gadgets, cars, or even fridges and luggage) also support BLE.

Ease of installation—Optimal setup requires planning where to position the fixed beacons or receivers in a venue (which can be provided quickly, no formal process required) and configuring each beacon with a special software. Configuration per beacon takes around 5-10 seconds per beacon. Risk of error is very low and in the case of a problem (e.g. misconfiguration), the fix can be applied locally with immediate effect (i.e. no need to re-calibrate the whole system)

Low cost to maintain—maintenance allows battery checking/replacement, which is true only for battery powered beacons. Battery powered beacons typically last from 1 up to 4 years. It is possible replace batteries or beacon hardware. Replacing a battery dead beacon with a new beacon with fresh battery is also a viable option as the hardware is very low cost ($10-$30/unit, as of this writing, and prices are only going to get cheaper). A beacon may alternatively draw power from an external source (or may obtain some/all power from a source such as a solar cell) such that it may require no maintenance.

Ubiquitous—Users only need to install a mobile application that features our technology to start enjoying the system. No proprietary hardware or training or preliminary setup is required. With a target audience of most smartphones and various mobile devices, most users are covered.

High performance—With the flexibility of using more beacons due to their low cost and flexibility in placing them in a venue dynamically, embodiments of the present invention are capable of calculating position in real-time, with no significant processing or memory burden, down to 1 metre resolution.

Robust—embodiments of the present invention are smart enough to always yield position results in possible locations (i.e. will never place user outside a map), will work when a user's smartphone is offline, even where there is no WiFi or cellular mobile signal.

In preferred embodiments, preferably:
  a. Beacons are distributed and fixed in venue
  b. Beacons are each configured, one by one Once hardware is installed, a location determination system according to preferred embodiments of the present invention is arranged to calculate position by the following steps, preferably in given order:
  a. Listen to all BLE signals in vicinity
  b. Filter signals belonging to the system
  c. Store these signals in memory
  d. Use most, if not all signal data in memory to calculate position real-time
  e. Display position result on user's device, as a pin on a map It will be appreciated that the position result need not be displayed and/or need not be displayed on a user's phone. It may be displayed elsewhere; used for providing other data or services and/or logged for future purposes such as tracking or behavior analysis.

BRIEF DESCRIPTION OF THE FIGURES

Embodiments of the present invention will now be described, by way of example only, with reference to the accompanying drawings in which.

DETAILED DESCRIPTION OF CERTAIN EMBODIMENTS OF THE INVENTION

Figure 1:
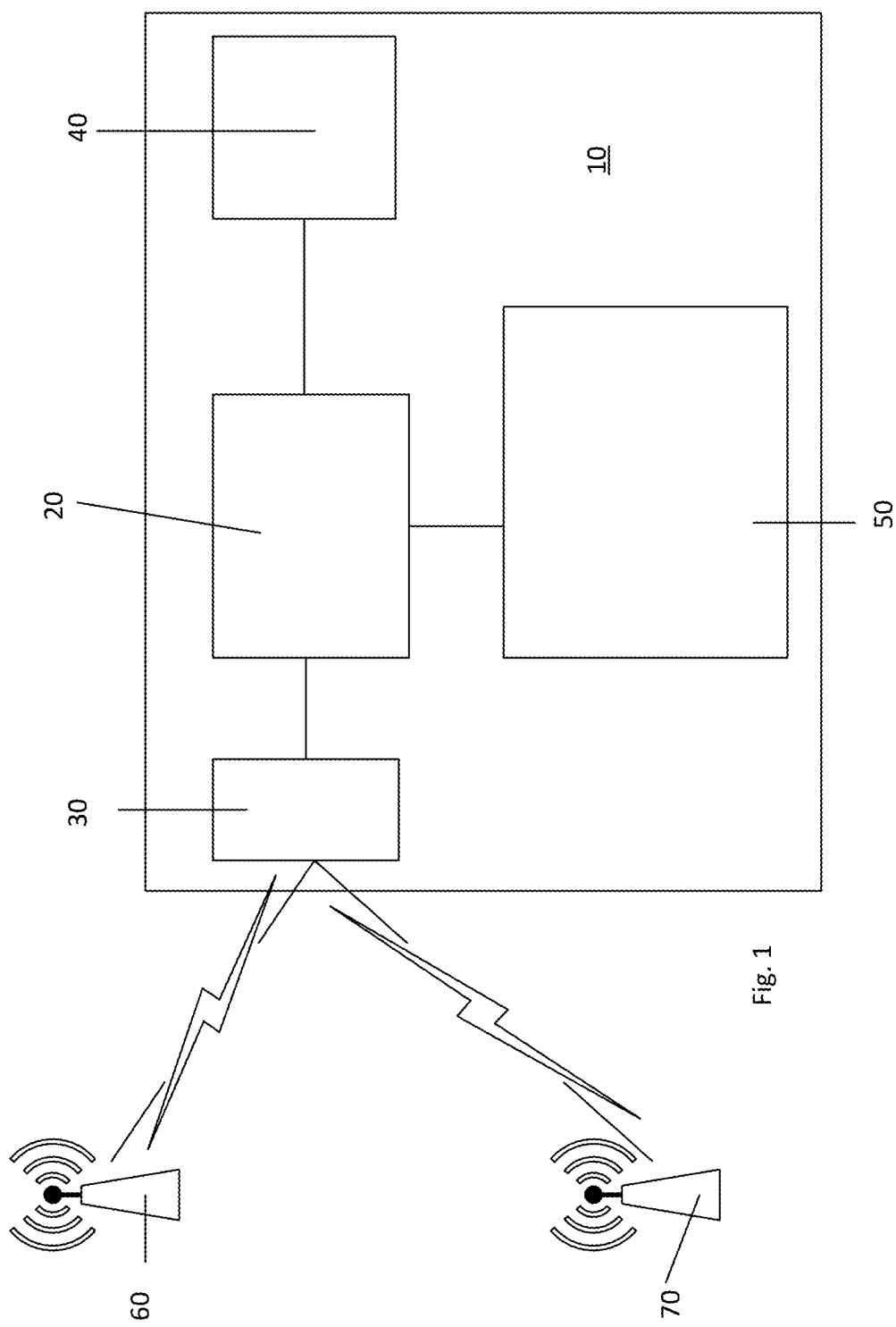
FIG. 1 is a schematic diagram of a mobile device positioning system according to an embodiment of the present invention.

FIG. 1 is a schematic diagram of a mobile device positioning system according to an embodiment of the present invention.

The mobile device positioning system 10 includes a processing unit 20, a receiver 30, a data store 40 and a display 50. In this embodiment, the mobile device positioning system 10 is part of a smartphone.

In operation, the system 10 receives at the receiver 30 signals from a number of transmitters 60, 70. The receiver obtains a measure of the strength of each respective signal and passes this to the processing unit. The processing unit determines a location of the transmitter 60/70 corresponding to each respective signal from data within each signal and then determines a zone in between the transmitters 60, 70. The location of the smartphone within the zone is determined in dependence on the measure of the strength of each respective signal as is discussed in greater detail below.

Figure 2:
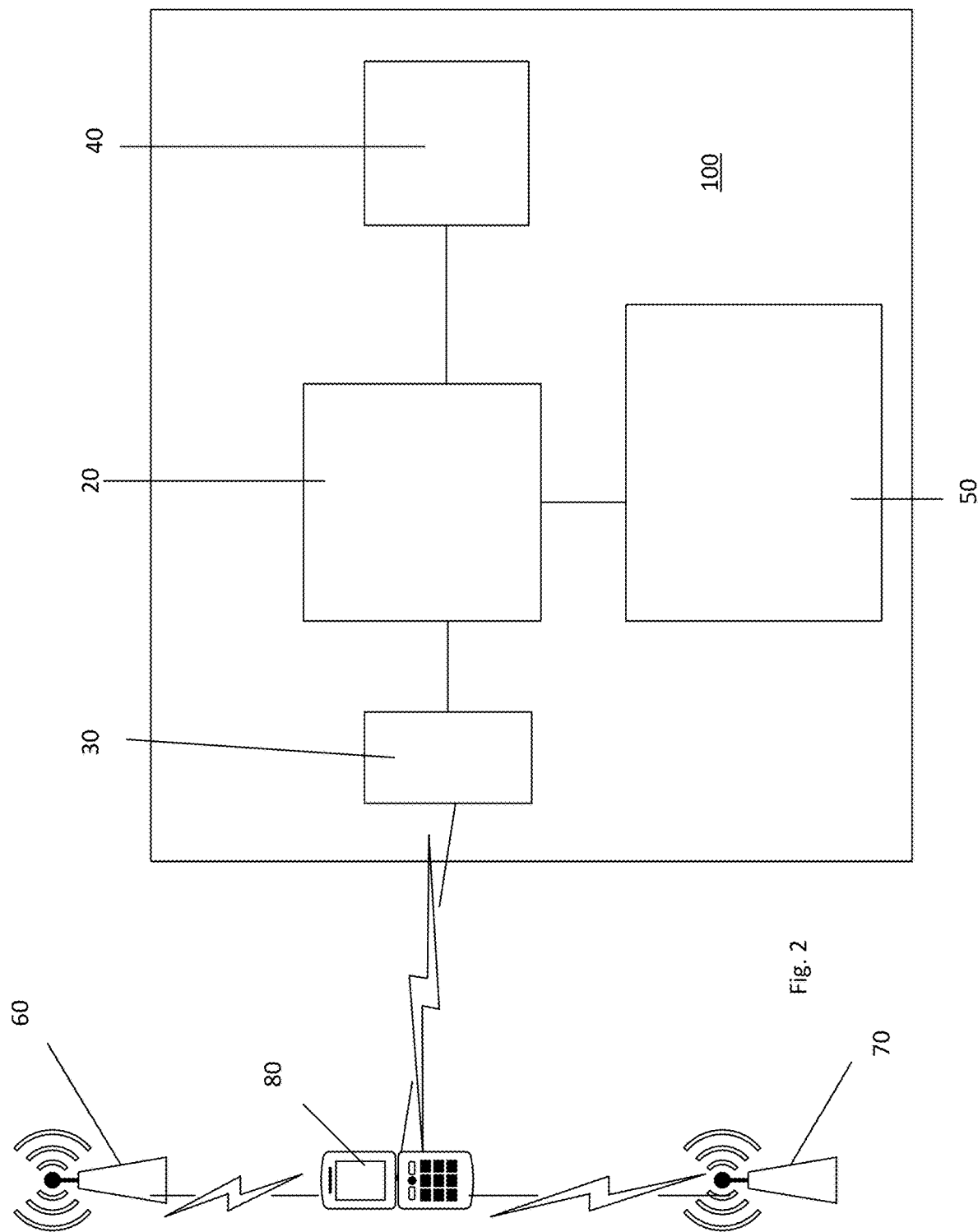
FIG. 2 is a schematic diagram of a mobile device positioning system according to another embodiment of the present invention; and, FIGS. 3-10 are schematic diagrams illustrating aspects of operation of the mobile device positioning system of FIG. 1, or 2.

FIG. 2 is a schematic diagram of a mobile device positioning system according to another embodiment of the present invention. FIG. 2 corresponds to FIG. 1 except that the mobile device positioning system is separate to the mobile device/smartphone. For example, the system 100 may be operated by a server or other system that receives data on signals relayed by a mobile device 80. In this manner, the processing load on the mobile device 80 can be limited and the mobile device 80 nevertheless tracked/located. In this embodiment, the mobile device need not be a mobile telephone and could be a dedicated system that could be used for security, patient or customer monitoring or other applications. Positioning data may nevertheless be returned to the mobile device 80, for example as coordinates to be used (such as to show a position on a locally stored map) or as part of a user interface, webpage or the like provided by the system 100.

In the embodiments of FIGS. 1 and 2, the positioning system is preferably arranged to output the determined position on a graphical user interface on the display 50. A marker or other representation may be overlaid or the mobile device at the position on a graphical illustration of the zone. The data store 40 may store maps or other visual representations. In addition or as an alternative to transmitters transmitting their location, position information on transmitters may be stored by the data store 40 (and the map and position information may optionally be combined).

It will be appreciated that determining the location of the transmitter corresponding to each respective signal from data within each signal can be done in various different ways. For example, the signal may itself include or encode the location (such as x, y and optionally z and floor) coordinates relative to a predetermined origin; it may include a label or other identifier from which the location can be determined (for example by cross-referencing the label or identifier with a database that holds location information).

Transmitters 60, 70 may, for example, be beacons such as BlueTooth beacons. Beacons may have a fixed, predetermined advertisement interval or this may be configurable. A typical advertisement interval may be between 300 ms up to 3 seconds. It will be appreciated that the more frequent the interval (which results in more data points) the accurate the location is likely to be. However, increased frequency will affect power consumption.

Beacons may be used in addition for other purposes in conjunction with embodiments of the present invention—as long as location can be determined from the received signal, it doesn't actually matter what the received signal may be about (it will be appreciated that in practice, additional data may be added to indicate location or some existing data may be used to indicate or derive location). For example, the beacon may be providing advertisements or security information but properties of the signal can still be employed in embodiments of the present invention.

In one embodiment, the processing unit has access to a register of the location of each beacon. In another embodiment, location information is communicated by each beacon when communicating receipt of a signal and its strength.

Although the focus of this application is on the use of beacons and in particular BlueTooth such as BlueTooth Low Energy (BLE) Beacons, it will be appreciated that transmitters other than beacons could also be used.

Various aspects involved in implementing embodiments of the present invention are discussed below, followed by explanation of operation.

Distributing and Fixing Beacons in Venue

Beacons are preferably positioned in a venue so that they are almost equal distance from each other, and the majority, if not all, of the accessible space is covered by the transmission area of at least 2 beacons. Once positions are determined, the beacons are preferably stuck or otherwise mounted to walls/ceilings. The transmission area between beacons is considered a logical zone.

Configuring Every Beacon, One by One

Each beacon is preferably configured to self-contain its position information in memory or some other fixed or long term data store, preferably in terms of relative coordinates. A beacon's advertisement data may be changed to contain its x and y position, as percentage values on the map graphic or other information may be used (or added to the advertisement). For example, a beacon's advertisement data might be configured to contain encoded information that the beacon has x=0.5, y=0.1 which means beacon is placed at 50% of x-axis and 10% of y-axis. It5 will be appreciated here that advertisement here refers to the broadcast the beacon makes indicating its presence rather than the transmission of advertising material for products/services although such data may also be encoded at source or by the beacon or otherwise be added to by the beacon at transmission time so as to provide this information.

It will be appreciated that beacons may be pre-configured at manufacture (or some later time) and a fixed identifier in the beacon correlated with location information stored elsewhere so that a location lookup can be performed against the fixed identifier as and when it is received from the beacon by a mobile device. In another alternative, beacons may be configured in groups rather than each being individually configured. It will also be appreciated that a beacon may include components (or have the ability to obtain data) that allows it to determine its own location rather than the user having to configure it at this stage.

Example Operation:

a. Mobile Device Listens to all BLE Signals in Vicinity

The receiver 30 listens to all BLE signals it can hear. Android and iOS SDK's provide native API's to achieve this via the BLE sensors in the smartphone.

b. Filter Signals Belonging to the System

BLE Beacons can be identified by their advertisement UUID. In addition, an encoded data structure is preferably used for beacon advertisement. Hence, BLE signals that either have a different UUID or have different/unrecognized data structure are filtered out.

c. Store Non-Filtered Signals in Memory

All heard signals are stored in memory of the mobile device 10 or system 100. This allows the system 10/100 to calculate how reliable a signal is (by looking at history of readings) and to use as much signal data as possible for position calculation, factoring in reliability score of each signal and applying smoothing filters as necessary. A time based approach may be applied to storage of non-filtered signals. For example, signals received over the past n seconds may be stored. Alternatively, a timestamp may be stored with received signals and used to determine which signals to take into account.

d. Use Most, if not all Signal Data in Memory to Calculate Position Real-Time

Preferably, the system 10/100 makes a very strong assumption that the mobile device is confined to the area (zone) enclosed by the beacons in the vicinity. Optionally, the system could be tuned or configured to only consider beacons heard in the last X seconds or it can be configured to take into consideration only up to Y nearest beacons for this assumption.

e. Calculate Position

After the assumption in d, signal strength value of signals (aka RSSI) is converted to a physical estimate. A preferred equation for converting this is discussed below.

f. Determine Centre of Mass

The centre of mass can then be calculated based on physical estimate from each beacon that is taken into calculation.

The centre of mass may be calculated and/or determined in dependence on heuristic rules. For example, if only 1 beacon is considered, there is no zone between 2 beacons and the system 10/100 preferably applies a heuristic rule setting the best estimate for position as the beacon's position itself as shown in FIG. 3.

For 2 beacons, there is a zone and the system 10/100 preferably applies an algorithm that assumes the mobile device is at some position along a straight line between the two beacons. The system 10/100 preferably uses an algorithm that calculates a position along the line from a weighted average of the physical estimates as shown in FIG. 4.

For 3 or more beacons, there is a zone and the system 10/100 preferably applies an algorithm that assumes the mobile device is at some position in the polygonal area enclosed by the beacons. Preferably, the system 10/100 applies an algorithm that calculates a centre of mass, using physical distance estimates as weight indicators as shown in FIGS. 5 and 6.

In FIG. 5, a triangular zone is formed which preferably is the only allowed area within which a mobile device detecting the three beacons may be positioned within according to the algorithm. The position is preferably calculated as centre of mass, where each beacon is representing a mass particle.

Figure 6:
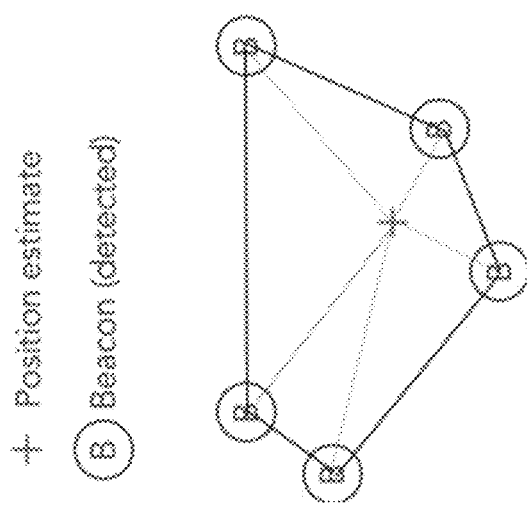

In FIG. 6, there are illustrated 5 detected beacons. Position is assumed to be in the zone enclosed by the five beacons.

A good analogy is the position being hooked to beacons with elastic strings and each beacon trying to pull the position to itself.

In FIGS. 4 to 6, the mobile device is represented by the 'X' and beacons each by a 'B' in a circle. The lines between beacons and the mobile device are purely for illustration purposes, the solid lines illustrating the logical zone that is considered to bound the beacons and the fainter lines showing distance from the device to each beacon.

Example Screenshots

FIGS. 7 to 10 show screenshots displaying data obtained using an embodiment of the present invention.

Beacons are shown as bold black dots enclosed by growing parentheses.

Figure 7:
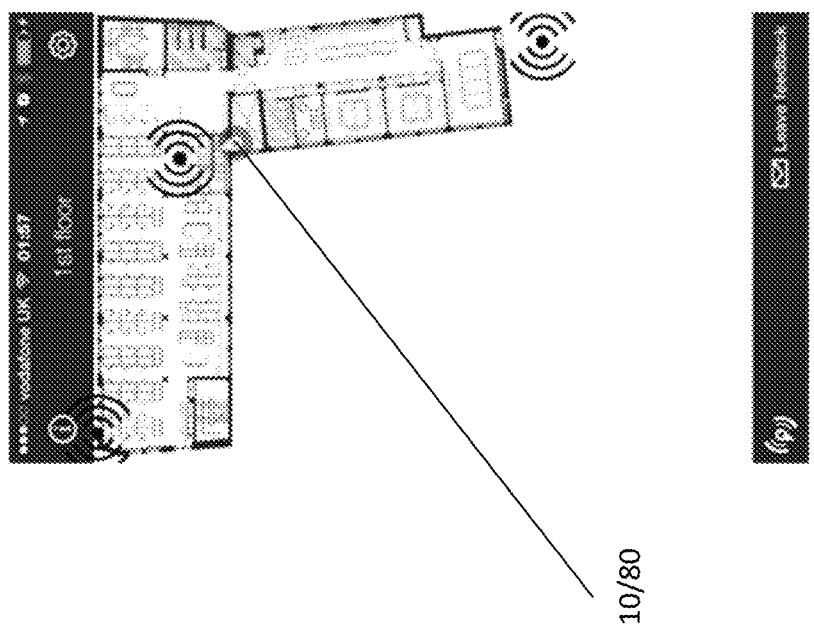

In FIG. 7, the beacon nearest the mobile device 10/80 probably has the strongest heard signal and the beacons at top left and bottom right have much weaker heard signals, hence the resulting position.

Figure 8:
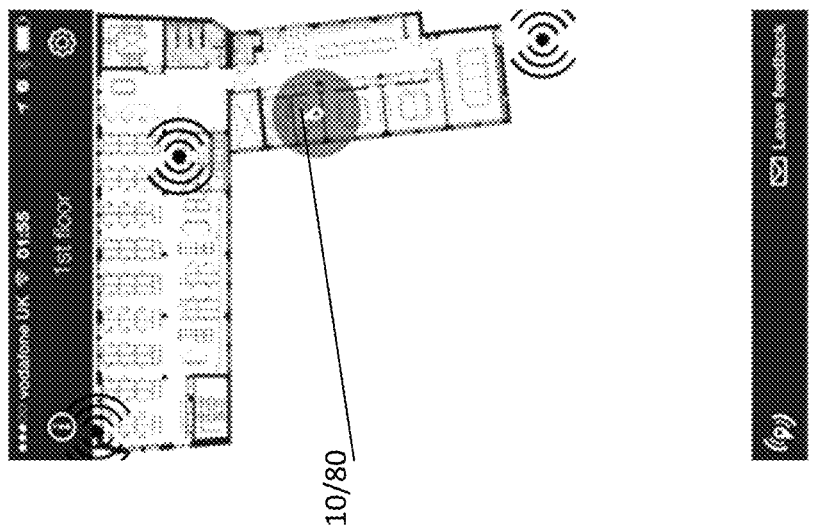

In the illustration of FIG. 8, an accuracy circle is shown about the mobile device. This gives visual feedback regarding uncertainty of position at that instance. This is calculated based on accuracy of each beacon's latest set of readings.

Figure 9:
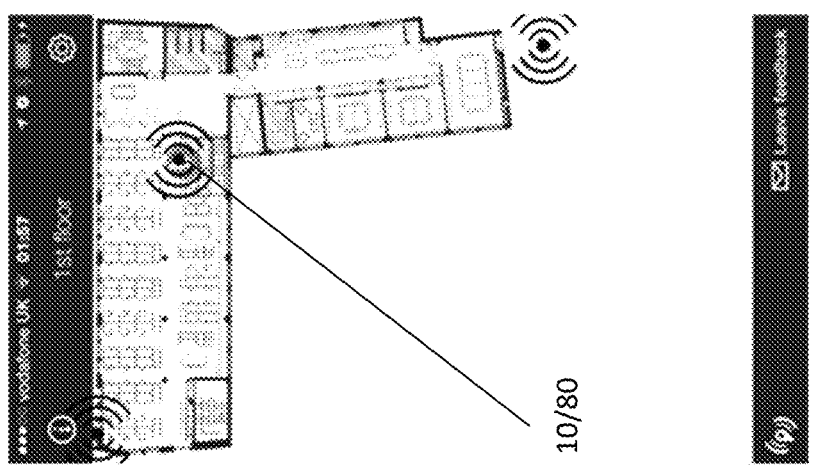

In the illustration of FIG. 9, it is likely that the beacon in centre is very strongly heard or the other two beacons on corners are very weakly heard, hence the position is anchored almost at centre's beacon's centre.

Figure 10:
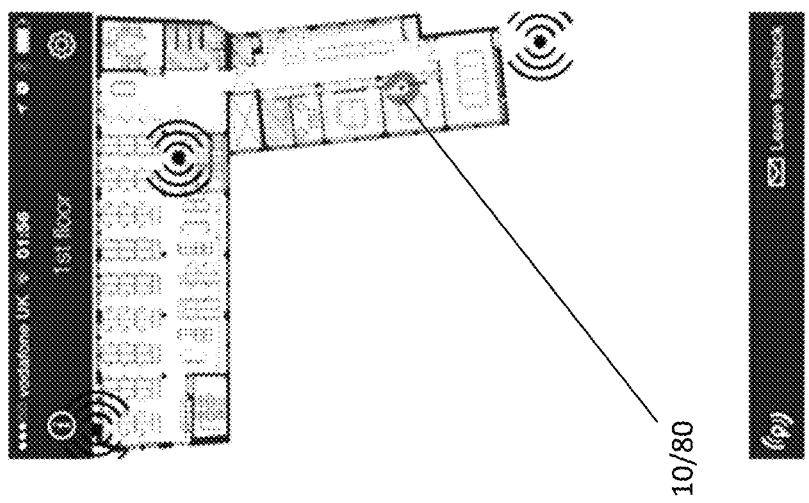

In the illustration of FIG. 10, the bottom right beacon is probably heard stronger now, pulling position towards itself.

In addition to the above, finding optimal configuration parameters is important. The system currently allows the following parameters Map Height:

Height of map graphic used. Used in calculation of size of accuracy circle around position pin representing the mobile device 10/80.

Map Width:

Width of map graphic used. Used in calculation of size of accuracy circle around position pin.

Bias Power:

Beacon's effect in pulling position to itself. Inverse of each beacon's distance is taken to this power for calculating centre of mass.

Max Walking Speed:

Allowed movement speed for user. Displacements faster than this value is not allowed and is smoothened over time.

Nearest Beacons to Use:

If set, up to this many beacons are allowed in position calculation.

Measurement History Timespan:

Position calculation uses beacons heard in the last X seconds only.

Single Beacon Accuracy:

Accuracy circle's relative radius size when only one beacon is used in position calculation.

In addition, conversion from RSSI to physical distance estimate per beacon is also open for customisation. By default, the following conversion equation is used although others may also be used:

$$\text{absolute distance (meter)} = e^{((-RSSI-A)/n)}$$

where A=80, n=16, and RSSI is measured in dB.

It will be appreciated that this equation can be updated in accordance with physical circumstances of the venue as well as transmitting power levels of beacons in use. It will also be appreciated that embodiments of the present invention while particularly suitable for indoor use, need not be so constrained and could be used outdoors subject to placement of suitable transmitters.

It is to be appreciated that certain embodiments of the invention as discussed above may be incorporated as code (e.g., a software algorithm or program) residing in firmware and/or on computer useable medium having control logic for enabling execution on a computer system having a hardware processor. Such a computer system typically includes memory storage configured to provide output from execution of the code which configures a hardware processor in accordance with the execution. The code can be arranged as firmware or software, and can be organized as a set of modules such as discrete code modules, function calls, procedure calls or objects in an object-oriented programming environment. If implemented using modules, the code can comprise a single module or a plurality of modules that operate in cooperation with one another.

Optional embodiments of the invention can be understood as including the parts, elements and features referred to or indicated herein, individually or collectively, in any or all combinations of two or more of the parts, elements or features, and wherein specific integers are mentioned herein which have known equivalents in the art to which the invention relates, such known equivalents are deemed to be incorporated herein as if individually set forth.

Although illustrated embodiments of the present invention have been described, it should be understood that various changes, substitutions, and alterations can be made by one of ordinary skill in the art without departing from the present invention which is defined by the recitations in the claims below and equivalents thereof.

What is claimed is:

1. A mobile device comprising:
    a receiver configured to receive signals, each of the signals being from a transmitter in an area, and each of the signals including location coordinates of the respective transmitter relative to a predetermined origin;
    a processor coupled to the receiver, the processor configured to:
        determine a zone in the shape of a polygon, the polygon defined by four or more vertices, each vertex being a location of a transmitter, and the determination based on the location coordinates of the respective transmitter;
        calculate a signal strength of the transmitter at each vertex;
        determine a relative distance of the mobile device from within the zone to each vertex, each relative distance based on the signal strength of the transmitter at each vertex; and
        determine a position, relative to the predetermined origin, of the mobile device in the polygon based on each relative distance.

2. The mobile device of claim 1, wherein the receiver is configured to passively listen to signals from transmitters to thereby receive the signals.

3. The mobile device of claim 1, wherein each of the transmitters comprises a BlueTooth beacon, the signals comprising advertisements from the beacons.

4. The mobile device of claim 1, wherein when the processor determines the relative distance of the mobile device from within the zone to each vertex, the processor is further configured to calculate distance according to:

distance (in meters)=$e\hat{}((-RSSI-A)/n)$ where RSSI is the signal strength in decibels (dB) and A and n are system parameters determined based on physical circumstances of the area.

5. The mobile device of claim 1, further comprising:
    a display device coupled to the processor;
    the processor configured to:
        receive the signals from the receiver, each of the signals has an indication of signal strength;
        filter the signals based on an indication of reliability, the filtering results in filtered data comprising information regarding one or more transmitters in the area;
        determine a single-point position, relative to the predetermined origin, of the mobile device from a single transmitter if the filtered data has information on only one location transmitter;
        determine a two-point position, relative to the predetermined origin, of the mobile device from only two transmitters if the filtered data has information on only two transmitters;
        display, on the display device, an indication of the position, the single-point position, or the two-point position.

6. The mobile device of claim 5 wherein when the processor determines the two-point position of the mobile device from only two transmitters, the processor is further configured to:
    determine a straight line having endpoints being the location coordinates of the only two transmitters in the filtered data;
    determine a relative distance of the mobile device along the straight line to each endpoint, each relative distance based on the indication of signal strength for the transmitter at the respective endpoint; and
    calculate the two-point position residing along the straight line based on each relative distance.

7. The mobile device of claim 5 wherein when the processor determines the single-point position of the mobile device from the single transmitter, the processor is further configured to limit the single-point position based on a value indicative of walking speed of a user carrying the mobile device.

8. The mobile device of claim 5 wherein when the processor determines the two-point position of the mobile device from only two transmitters, the processor is further configured to limit the two-point position based on a value indicative of walking speed of a user carrying the mobile device.

9. The mobile device of claim 5 wherein when the processor determines the position of the mobile device from four or more transmitters, the processor is further configured to limit the position based on a value indicative of walking speed of a user carrying the mobile device.

10. The mobile device of claim 5 wherein when the processor filters the signals based on the indication of reliability, the processor is further configured to only include signals in the filtered data received within a predetermined period of time.

11. The mobile device of claim 5 wherein when the processor filters the signals based on the indication of reliability, the processor is further configured to limit the signals in the filtered data to be a predetermined number of nearest location transmitters.

12. The mobile device of claim 5 wherein when the processor displays the indication of the single-point position, the processor is further configured to display a circle around the indication of single-point positon where radius of the circle is indicative of accuracy of the single-point position.

13. A method of determining a position of a mobile device, comprising:
    receiving signals by the mobile device from four or more transmitters, each signal including location coordinates of a respective transmitter relative to a predetermined origin;
    calculating, by the mobile device, signal strength of each signal;
    determining, by the mobile device, a zone in the shape of a polygon, the zone having four or more vertices, each vertex being a location of a transmitter, and the determining based on the location coordinates; and
    determining, by the mobile device, the position of the mobile device within the zone based on the signal strength of each signal.

14. The method of claim 13, further comprising displaying, on a user interface, the position of the mobile device and overlaying a marker for the mobile device at the position on a graphical illustration of the zone.

15. The method of claim 13:
scoring reliability of each signal, and thereby creating a reliability score for each signal;
filtering the signals based on the reliability scores, the filtering creates filtered signals;
wherein determining the zone having four or more vertices further comprises determining the zone using only the filtered signals; and
wherein determining the position of the mobile device further comprises determining the position using only the filtered signals.

16. The method of claim 15 wherein scoring reliability further comprises marking as unreliable signals received earlier than a predetermined time.

17. The method of claim 16 wherein scoring reliability further comprises scoring reliability based on signal strength for each signal.

18. The method of claim 13 wherein determining the position of the mobile device further comprising limiting allowable positions based on a value indicative of maximum walking speed of a user carrying the mobile device.

19. The method of claim 13 wherein receiving signals further comprises receiving at least one signal from a transmitter that is moving.

* * * * *